UNITED STATES PATENT OFFICE.

FLOYD M. WILSON, OF HARTMAN, AND JAMES P. CAMPBELL, OF LAMAR, COLORADO.

ALFALFA FEED.

1,005,392. Specification of Letters Patent. Patented Oct. 10, 1911.

No Drawing. Application filed February 18, 1911. Serial No. 609,432.

*To all whom it may concern:*

Be it known that we, FLOYD M. WILSON, of Hartman, Colorado, and JAMES P. CAMPBELL, of Lamar, Colorado, both citizens of the United States, have invented certain new and useful Improvements in Alfalfa Feed, of which the following is a specification.

The invention relates to so-called alfalfa meal prepared for cattle and livestock feeding, but we, of course, desire to cover and protect the product whether it is used as a feed or not.

One way of preparing feed from alfalfa has been to pass the hay (by which I mean the leaf and stem) through the grinder, which results in cutting the stems into a mealy product and pulverizing the dry and fragile leaf in that step of the process and in the subsequent milling steps. In this system it will be readily understood that much of the broken and comminuted leaf is blown away with the fine dust and dirt if an air blast is used to remove the latter. This results in the loss of a portion of the most valuable nitrogenous nutriment; the leaves being rich in proteids. This evil we have partly remedied or mitigated by screening the leaves and stems, separating the stems and leaves, grinding the stems without the leaves, and then commingling the ground stems with the leaves. Even so, much of the leaf is reduced by agitation or otherwise to so fine a form as to be lost as dust, or, if retained in the feed to be injurious to the cattle; probably because it acts as a mechanical irritant of the mucous membrane of the breathing apparatus of cattle.

The presence of pulverized particles in the feed is, of course, a well recognized evil. This evil is substantially eliminated in the preferred form of our invention, providing a product which is very different in appearance from any other alfalfa meal with which we are acquainted. The leaves, instead of appearing in small fragments and with considerable very finely divided powder, are present as whole or broken leaves of characteristic appearance with very little attendant leaf dust.

We have so far been able to accomplish the most perfect form of our product by a single process, which, being a separable invention, forms the subject-matter of our separate patent application. Conceivably, however, the product could be formed by a more laborious and expensive way.

By our best form of process we first separate the dry leaves from the dry stems, for example by shaker sieves, then we chop, grind or otherwise reduce the stems to any desired extent. We toughen the separated leaves by subjecting them to visible steam or moisture and then we remix and commingle the ground stems with the leaves in the blast of an exhaust or blower, or any other convenient manner.

The process is specially suitable for use in a dry climate where the alfalfa hay cures to a dry brittle state, enabling the leaves to be shattered from the stems readily before grinding. It may be that in very humid climates the hay might have to be exposed to direct sunlight or artificially dried before attempting to separate the leaves from the stems. It may be, therefore, that our invention is particularly appropriate and valuable for the drier western portions of the United States and for similar climates.

It will be seen that upon the remixing of the relatively moist leaves and relatively dry stems the stems will rob the leaves of some moisture and tend toward an equalization of moisture throughout the whole product. This fact is of value because there is not too much moisture in the whole product and it can be at once packed and shipped in one-hundred pound sacks. The moisture being regulable, may be varied to compensate for atmospheric variations to give a whole product with just the moisture content desired for the feed.

By comminuted we do not mean that the stems are reduced to an impalpable powder, but we use this term as a more general term than " ground " as indicative that the method of reduction is not an essential of the product.

We claim:

1. Alfalfa feed comprising ground or comminuted alfalfa stems and substantially unground and uncomminuted alfalfa leaves intermixed with said stems.

2. Alfalfa feed comprising ground or comminuted alfalfa stems and substantially unground and uncomminuted alfalfa leaves intermixed with said stems without substantial loss of leaf substance from and in substantially the same proportion as the natural hay.

3. Alfalfa feed comprising comminuted stems identified by the characteristics resulting from dry reduction and substantially uncomminuted leaves in a state identified by the characteristics resulting from rough handling in a moisture-toughened condition.

In testimony whereof we have signed this specification in the presence of two subscribing witnesses.

FLOYD M. WILSON.
JAMES P. CAMPBELL.

Witnesses:
DAVID C. FACHNEY,
MORTON C. STEEN.

Copies of this patent may be obtained for five cents each, by addressing the "Commissioner of Patents, Washington, D. C."